US007974821B1

(12) United States Patent
Alspach

(10) Patent No.: US 7,974,821 B1
(45) Date of Patent: *Jul. 5, 2011

(54) VECTOR-BASED REPRESENTATION OF A LENS FLARE

(75) Inventor: Ted Alspach, Cave Creek, AZ (US)

(73) Assignee: Adobe Systems Incorporated, San Jose, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 12/419,984

(22) Filed: Apr. 7, 2009

Related U.S. Application Data

(63) Continuation of application No. 11/687,531, filed on Mar. 16, 2007, now Pat. No. 7,526,417, which is a continuation of application No. 10/010,916, filed on Dec. 6, 2001, now Pat. No. 7,206,725.

(51) Int. Cl.
*G06G 7/48* (2006.01)
(52) U.S. Cl. .......................................................... 703/6
(58) Field of Classification Search .................... 703/6
See application file for complete search history.

(56) References Cited

U.S. PATENT DOCUMENTS 5,798,752 A * 8/1998 Buxton et al. ................. 715/863
7,206,725 B1 * 4/2007 Alspach ............................ 703/2

OTHER PUBLICATIONS

After Effects; p. 74; Adobe Magazine, 2000.
Bob's Render FAQs; four pages; 1997; obtained from www.scriptspot.com/bobo/rendfaq/RFAQ0095.HTM.
Corel Corporation, *KP Vector Effects 1.5 User Guide for Macintosh and Windows*, pp. 7 and 47-50 (Copyright 2000).
"Knoll Light Factory"; Balis (reviewer of Knoll software): pp. 1-11; Feb. 2001; obtained from http://www/kenstone.net/fcp_homepage/review_knoll_factory.html.
"Optical Light Effects" (part of the 'Maya' package—author unknown); pp. 1-11; 1999; obtained from http://caad.arch.ethz.ch/info/maya/manual/UserGuide/Rendering/RenderingTask/Look_Lights.fm3.html.
Premiere After Effects; pp. 76-77; Adobe Magazine; 1998.
Web pages "Focus, An Introduction to KPT®" by Anthony Celeste at URL=http://designer.com/focus/articles/kpt_1/kpt_print.htm (Copyright 1999-2000).

* cited by examiner

*Primary Examiner* — Hugh Jones
(74) *Attorney, Agent, or Firm* — Fish & Richardson P.C.

(57) ABSTRACT

Systems, methods, and computer program products for generating a vector-based representation of a lens flare are provided. In some implementations, a method is provided. The method includes presenting a plurality of visually rendered wire frame shapes, each one of the plurality of visually rendered wire frame shapes having a geometric correspondence with a lens flare component, each lens flare component being one of: a center point, a flare ring, a flare ray, or a halo, receiving a first input to manipulate a first visually rendered wire frame shape in the plurality of visually rendered wire frame shapes to interactively change the position or form of a first corresponding lens flare component, and presenting a visual rendering of the first corresponding lens flare component where the visual rendering reflects the change in the position or the form of the first corresponding lens flare component.

33 Claims, 4 Drawing Sheets

VECTOR-BASED REPRESENTATION OF A LENS FLARE

CROSS-REFERENCE TO RELATED APPLICATIONS

This application is a continuation application of, and claims priority to, U.S. patent application Ser. No. 11/687,531, entitled Vector-Based Representation of a Lens Flare, to inventor Ted Alspach, which was filed on Mar. 16, 2007, and U.S. patent application Ser. No. 10/010,916, entitled Vector-Based Representation of a Lens Flare, to inventor Ted Alspach, which was filed on Dec. 6, 2001, and now issued as U.S. Pat. No. 7,206,725 on Apr. 17, 2007. The disclosures of the above applications are incorporated herein by reference in their entirety.

BACKGROUND

The present invention relates to generating a vector-based representation of a lens flare.

A lens flare is an optical effect simulating a reflection of a bright light source within a lens or other optical system. Lens flares occur naturally; for example, when viewing a bright light source through a camera, the reflection of light against the curved surface of the camera lens produces a lens flare. When a picture is taken under such circumstances, the lens flare can be captured on the camera's film.

In general, a lens flare is characterized by a halo, one or more rings and/or one or more rays. The halo is a bright glow of light surrounding a central point, which represents the light source and is the brightest spot of the flare. Flare rings are random-sized duplicates of the halo and represent the reflection of the light source on a lens surface. The rings typically move in a single direction away from the light source. Flare rays are spikes of light emanating from the center of the flare.

In image-processing applications, lens flare effects are conventionally created with pixel-based tools that create a bitmap of the entire image, including the portion representing the flare. However, such pixel-based representations typically cannot be resized or edited; any modification to the flare (e.g. adding rays) generally requires the removal of the original bitmap and its replacement with an entirely new bitmap representing a new image including the modified flare.

SUMMARY

In general, in one aspect, the invention provides methods and apparatus, including computer program products, implementing techniques for representing a lens flare in an image processing application. The techniques include defining a set of parameters specifying one or more characteristics of a lens flare, generating a vector-based representation of the lens flare based on the defined lens flare parameters, and associating the plurality of vector objects as a group of objects. The set of lens flare parameters include a location of a center point for the lens flare in an image. The vector-based representation includes a plurality of vector objects representing a flare halo and one or more flare rings. The halo includes a circle centered at the center point. The rings include one or more circles centered on one or more lines passing through the center point.

Particular implementations can include one or more of the following features. Associating the vector objects can include identifying the plurality of vector objects as belonging to the representation of the lens flare. Associating the plurality of vector objects can include defining one or more dependencies between two or more of the plurality of vector objects, such that altering a first vector object causes a second vector object dependent on the first vector object to be altered. The vector-based representation of a lens flare can include one or more vector objects representing one or more flare rays, including one or more visible lines extending from the center point. The parameters include width of the flare, length of the flare, radius of the halo, number of rays, number of rings, and direction of the rings. The parameters can further include proportionality of width and length, opacity of one or more flare elements, color of one or more flare elements, brightness of one or more flare elements, fuzziness of one or more flare elements, size of the largest ray, and size of largest ring.

A visual representation of the vector based representation of a lens flare can be displayed. Displaying the visual representation of the vector based representation of a lens flare can include altering a background color in an image region proximate to one or more lens flare elements. The techniques can include receiving first user input specifying edits to the vector-based representation of a lens flare, and editing the vector-based representation of a lens flare in response to user input to generate an edited vector-based representation of a lens flare. Editing the vector-based representation of a lens flare can include changing values associated with one or more lens flare parameters. Displaying the visual representation of the vector-based representation of a lens flare can include displaying a visual representation of a plurality of lens flare elements, the plurality of lens flare elements including a lens flare halo, one or more lens flare rings, and optionally one or more lens flare rays. Receiving user input can include receiving electronic data representing a manipulation by the user of one or more of the displayed lens flare elements. Receiving user input can include receiving electronic data representing a selection of one or more of the displayed lens flare elements. The electronic data representing a manipulation by the user of one or more of the displayed lens flare elements can include electronic data representing a click and drag operation. The vector based representation of a lens flare can be generated in response to a single user input defining a location for the lens flare in an image.

The invention can be implemented to realize one or more of the following advantages. The vector-based representation of a lens flare is editable and resizable without loss of information. The vector-based representation maintains associations between one or more elements of the lens flare, thereby making the representation easier to edit. The associations identify which vector objects belong to the vector-based representation and enable all vector objects to be moved, resized, or edited as a collective group of objects, instead of as individual, unconnected objects. The associations also enable dependencies to be specified between the vector objects, such that altering one vector object will cause the dependent vector object(s) to be altered automatically. The vector-based representation can be generated in response to a single user input and can also be generated via a flare tool user interface that allows a user define or to edit flare parameters by clicking and dragging on an electronic display.

The details of one or more implementations of the invention are set forth in the accompanying drawings and the description below. Other features and advantages of the invention will become apparent from the description, the drawings, and the claims.

DESCRIPTION OF DRAWINGS

Like reference symbols in the various drawings indicate like elements.

DETAILED DESCRIPTION

Figure 1:
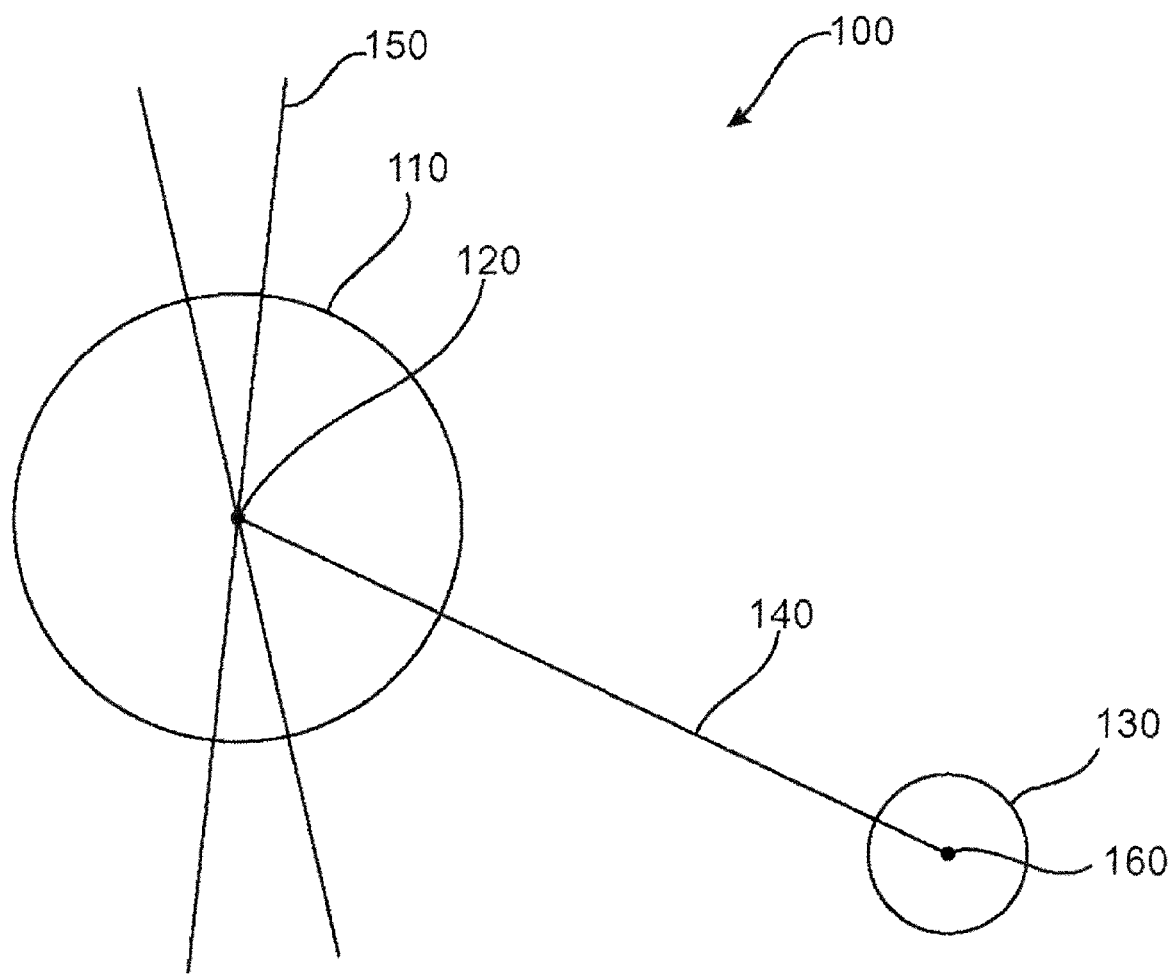
FIG. 1 shows a vector-based representation 100 of a lens flare.

FIG. 1 illustrates a vector-based representation 100 of a lens flare. In general, vector-based representation 100 includes one or more vector objects representing a halo, one or more rings, and, optionally, one or more rays. The halo can be represented as one or more circles 110 centered on a center point 120. Rings can be represented as circles 130 centered along an invisible line 140 that passes through the center 120 of the flare. Rays can be represented as visible lines 150 that also extend through the center point 120. Each of these flare elements can be further defined by one or more parameters as will be described in more detail below.

Figure 2:
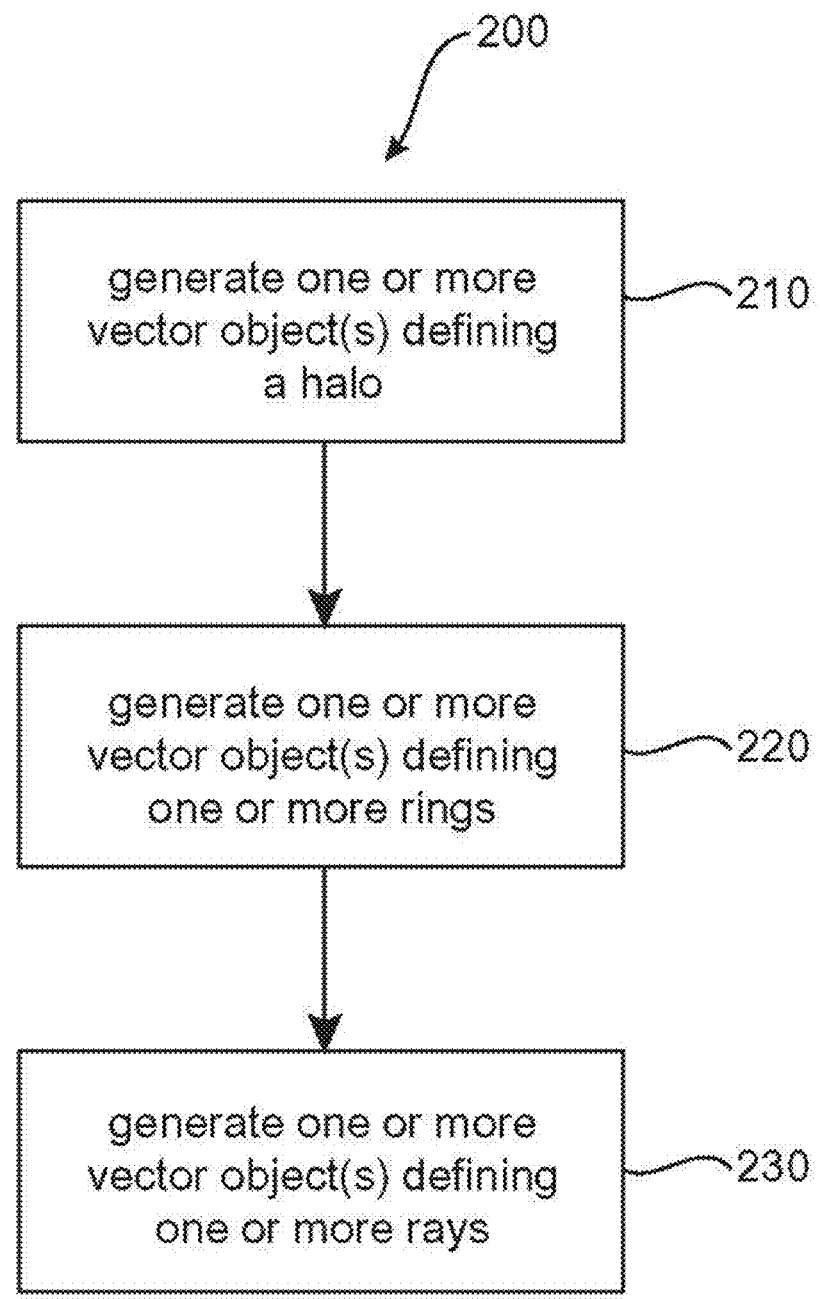
FIG. 2 shows a method 200 for generating a vector-based representation of a lens flare based on a set of flare parameters.

FIG. 2 shows a method 200 for generating a vector-based representation of a lens flare based on a set of flare parameters. This method, and the other methods and systems described herein, can be implemented in conventional image-processing program such as Adobe Illustrator, available from Adobe Systems Incorporated of San Jose, Calif.

The method 200 begins by generating one or more vector objects defining a halo based on a set of halo parameters (step 210). Next, vector objects defining one or more rings are generated based on a set of ring parameters (step 220). Finally, vector objects defining one or more rays may optionally be generated based on a set of ray parameters (step 230).

In one implementation, these objects include a set of properties that define the visual characteristics of the corresponding lens flare element, such as location, shape, color, transparency, and the like, based on parameter values obtained from a user or other source, such as from a data file, database or other memory location storing predetermined or default lens flare parameters. Optionally, one or more of the flare parameter values can be randomly-generated; for example, the size of the largest ring can be a user-specified parameter while the size of the remaining rings can be randomly determined.

In a preferred implementation, the flare parameters include a parameter defining a location within an image for a center point 120 of the flare. Other flare parameters can include parameters relating to the overall size of the flare, the flare center, and the halo, rings and/or rays that characterize the visual appearance of the flare.

Parameters relating to overall flare size can include, for example, width parameters and length parameters. Width parameters can define the size of the flare center. Length parameters can determine the length of the flare—for example, the distance from center point 120 to an end point 160. Optionally, some elements of the flare, such as one or more rings, may extend beyond the end point 160. Additionally, a proportionality parameter can be provided to enable a user to specify whether the width and length of the flare are interdependent. Thus, for example, in one implementation a user can specify a length or width and a proportionality factor, and the other parameter (i.e., width or length) will be automatically calculated based on the proportionality factor. Alternatively, a proportionality parameter can be a simple binary property, such that where proportionality is selected, a user may edit just one of the length or width of the flare, and the other property will be automatically calculated to preserve an existing relationship.

Parameters relating to the flare center can include, for example, opacity, color and brightness parameters. Opacity parameters can define the opacity (or transparency) of the flare center, and may be expressed as values in a range from 0% opacity (e.g., fully transparent) to 100% opacity (e.g., fully opaque). Color parameters can define a color value or values (e.g., a set of three values between 0 and 255 in RGB color space) for the flare center. Brightness parameters can define the brightness of the flare center, and may be expressed as values in a range from 0% brightness to 100% brightness.

Parameters relating to the flare halo can include, for example, opacity, color, gradient and brightness parameters as defined above, as well as other parameters defining, e.g., halo size and fuzziness. Opacity, color and brightness parameters can define the opacity (or transparency), color and brightness of the circle or circles representing the halo. Size parameters can define the radius of a circle or circles representing the halo. Fuzziness parameters can define an amount of feathering to be applied to the halo during rendering. Feathering is an effect which blends the foreground image with the background image and is characterized by a gradual fading of the edges into transparency. If no feathering is applied, the halo will simply look solid. Gradient parameters can define a fill that consists of one color gradually changing into another color. For example, the color at the center of the halo could be white but gradually take on a pinkish tint that finally turns into red at the outer edge of the halo.

Parameters relating to the flare rings can include, for example, opacity, color, gradient and brightness parameters defining the opacity, color and brightness of one or more flare rings. Ring parameters can also include parameters specifying the number of rings, the size of each ring, the size of the largest ring, the direction of rings (e.g., the orientation(s) of the invisible line or lines 140 along which the rings are centered), the location of the center point of each ring along the lines 140, and the fuzziness or feathering to be applied to each ring.

Finally, parameters relating to flare rays can include, for example, opacity, color and brightness parameters defining the opacity, color and brightness of one or more flare rays. Ray parameters can also include parameters specifying the number of rays, the length of each ray, the location (e.g., the orientation relative to the center point 120 of the flare) of each ray, length of the longest ray, and the fuzziness or feathering to be applied to each ray.

Preferably, the vector objects defining the various elements of a lens flare are grouped. The grouping can be implemented by defining associations between each of the vector objects. These associations can identify the vector objects as being part of the lens flare representation, thereby enhancing the editability of the representation. The associations enable the vector objects to be treated as a collective group of objects, instead of as individual, unrelated objects. For example, the entire group can be moved, resized or otherwise edited as one object instead of (or in addition to) object by object.

The associations can also create dependencies between the vector objects, further enhancing the editability of the representation by enabling changes to one or more of the vector objects to result in corresponding changes to other vector objects. Dependencies can include, for example, fixing the center of each ring to a point along the line 140 which in turn is locked onto the center point 120. With the vector objects associated in this fashion, when the location of center point 120 is moved, line 140 and its associated rings move as well such that line 140 passes through the new location of center point 120. Other dependencies can include, for example, dependencies between the halo and the center point 120 and between the rays and the center point 120. In one implementation, a group of vector objects can be generated as an Adobe Illustrator Plug-in or other software module that can store vector objects and associations between the vector objects. The vector objects can be implemented as Adobe Illustrator Paths which define the location, shape and gradient of the vector object. The Path can also include one or more handles that can be manipulated by a user to change the shape of the path.

The vector-based representation of the lens flare can be displayed to a user—for example, as a rasterized representation on a conventional output device such as a computer monitor. In general, the display will preferably include a visual representation of a plurality of lens flare elements, which can include a halo (which may include one or more circles), one or more lens flare rings, and optionally one or more lens flare rays. In implementations, the various lens flare elements can be displayed as they are generated, such that as soon as one flare element is generated, that portion is immediately displayed to the user. Alternatively, the lens flare may not be displayed until all lens flare elements have been defined (signified, for example, by a user selection of an "OK" or "Generate Flare" button in a graphical flare definition interface). In implementations, further processing can be performed on the lens flare representation, during or after generation or display—for example, the visual representation of the lens flare can be cropped to so that certain portions of the lens flare appear to extend beyond the boundaries of the display.

In general, the vector-based lens flares described herein are displayed by superimposing the lens flare upon a background image. In a preferred implementation, the display of a vector-based lens flare will result in a change in the color or colors of the background image in the vicinity of the lens flare as a result of the blending of the various visual lens flare elements into the background image (based, e.g., on the opacity, color, brightness and feathering parameters of the respective lens flare elements). Thus, for example, the display of a typical white lens flare can result in the lightening or brightening of a portion or portions of the background image under and near the elements of the lens flare.

Figure 3:
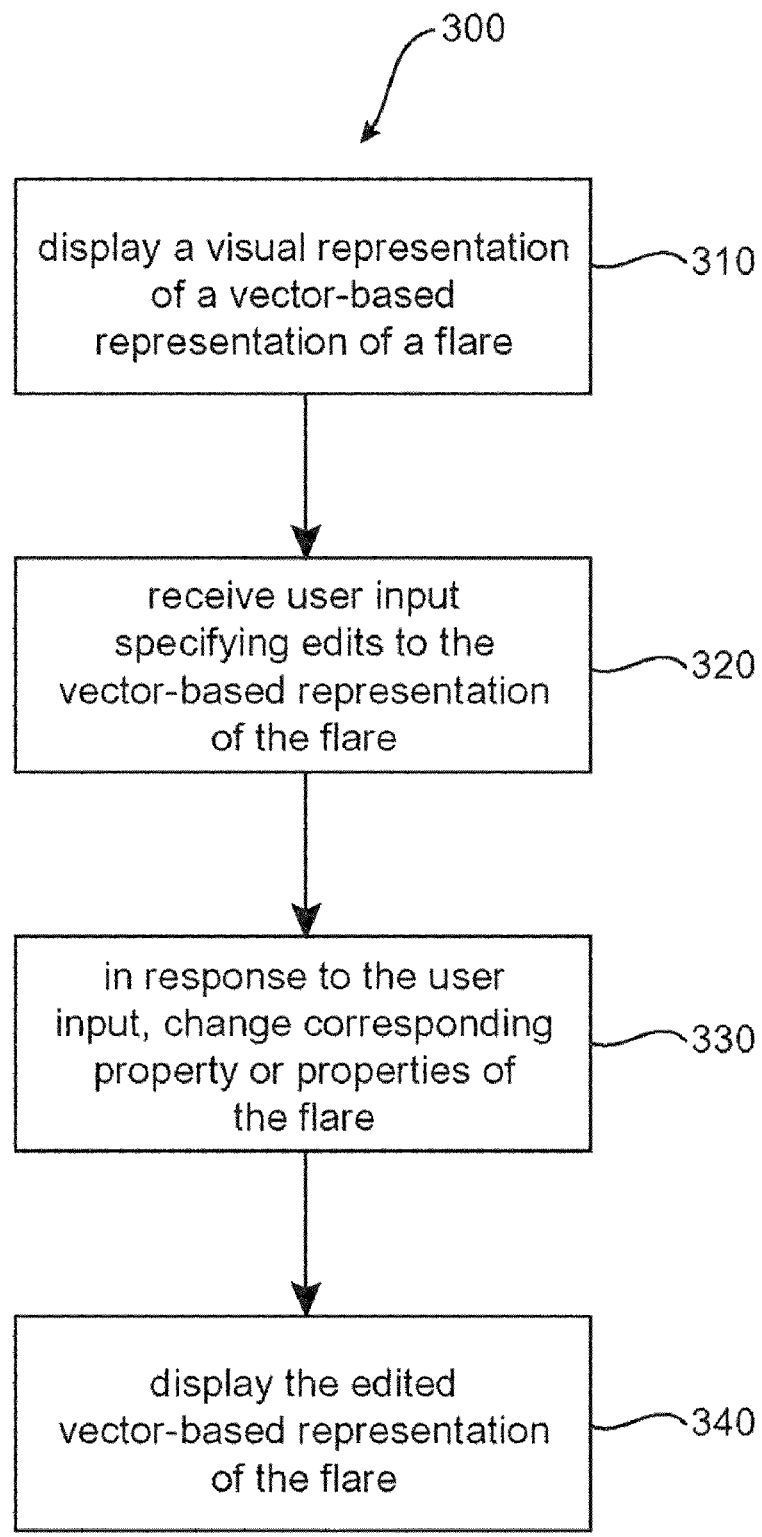
FIG. 3 shows method 300 for editing a vector-based representation of a lens flare.

A method 300 for editing a vector-based representation of a lens flare is illustrated in FIG. 3. The method begins when a vector-based representation of a lens flare—generated, for example, according to the method 200 as described above—is displayed to a user (step 310). The method receives user input editing the vector-based representation (step 320). The user input typically includes electronic data representing the addition, deletion or alteration of one or more parameters for the displayed vector-based representation of the lens flare, such as a changed width and/or length parameter corresponding to a resizing of the lens flare, or a change in the location of the lens flare within the image. More generally, the lens flare can be edited by changing any of the lens flare parameters, such as those described above—for example, by adding or removing one or more lens flare rings or rays, changing the location of rings or rays within the lens flare, changing the opacity, color or brightness of one or more lens flare elements, or the like. In response to the user input, the corresponding parameters are changed (e.g., by changing the corresponding property or properties of the appropriate vector objects) (step 330). The edited vector-based representation of the lens flare is displayed (step 340), which may occur concurrently with the editing process or after editing is complete, as discussed above.

To provide for interaction with a user, the present invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users. The graphical user interface typically accepts gestural input with the aid of a pointing device such as a mouse and converts such gestures to graphic representations in the document, typically displayed on a screen or monitor.

Figure 4:
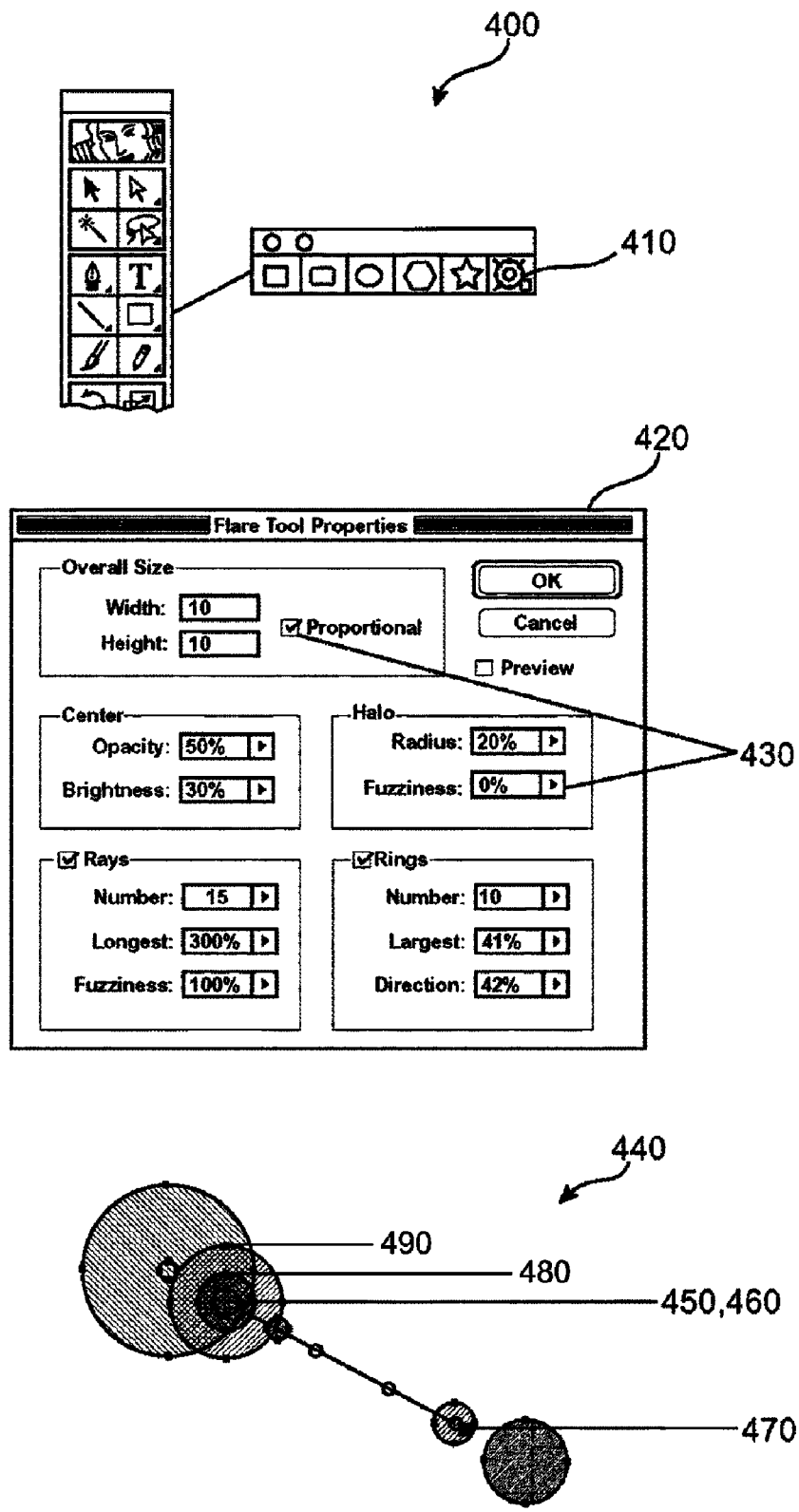
FIG. 4 shows an exemplary user interface for methods 100 and 200.

FIG. 4 shows an exemplary graphical user interface 400 including a flare tool 410 that is controlled by a pointing device such as a mouse.

In one implementation, a vector-based representation of a lens flare can be generated in response to an user input defining a location for the lens flare in an image. The user input can consist of a single mouse click, performed, for example, when a cursor representing the flare tool 410 has been positioned at a desired location in an underlying image, which may correspond, for example, to the location of the center point 120 of the flare as described above. Upon receiving the user input, the user may be prompted to specify values for one or more parameters for the lens flare, such as through a dialog box 420 having data fields 430 for a set of parameters. Optionally, a flare can be automatically generated and displayed in response to a single input, such as a single mouse click, defining the location, based on predefined or default parameter values. In implementations, the display can be a wireframe representation 440 of the flare, including handles that the user can select and drag to alter the appearance of the lens flare.

In another implementation, a vector-based lens flare can be generated in response to a click and drag operation. To define a halo, the user clicks and holds the mouse to establish the center point 450 and then drags the mouse to define the size of the center 480 and of the halo 490. For example, the center size can be determined based on where the dragging stops and the halo size can be calculated as a percentage of the center size. A wireframe representation 440 of the flare is displayed on the computer screen, including a center handle 460 positioned on the center point 450 of the flare.

To define rings or rays, the user can click at a point 470 in the image to define a line extending from the flare center 450 to point 470. The length and direction of the line can be changed by selecting a handle at the endpoint 470 and dragging the handle to a desired location. Rings can be generated along the line by clicking at a point on the line and dragging to define a ring radius. A line with no defined rings can be treated as a ray.

The invention can be implemented in digital electronic circuitry, or with firmware or software embodied in hardware. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of embodiments of the invention have been described. Nevertheless, it will be understood that various modifications may be made without departing from the spirit and scope of the invention. For example, the steps of the methods described herein need not be performed in the order described. Additionally, as described above, the vector-based representation could be cropped or framed to enhance the visual appearance. Accordingly, other embodiments are within the scope of the following claims.

What is claimed is:

1. A computer-implemented method, comprising:
   presenting a plurality of visually rendered wire frame shapes, each one of the plurality of visually rendered wire frame shapes having a geometric correspondence with a lens flare component, each lens flare component being one of: a center point, a flare ring, a flare ray, or a halo;
   receiving a first input to manipulate a first visually rendered wire frame shape in the plurality of visually rendered wire frame shapes to interactively change the position or form of a first corresponding lens flare component;
   presenting a visual rendering of the first corresponding lens flare component where the visual rendering reflects the change in the position or the form of the first corresponding lens flare component; and
   automatically modifying a location or size of a second visually rendered wire frame shape in the plurality of visually rendered wire frame shapes to compensate for the change to the first lens flare component, the second visually rendered wire frame shape being different from the first visually rendered wire frame shape.

2. The computer-implemented method of claim 1, wherein presenting the plurality of visually rendered wire frame shapes includes presenting one or more handles for each visually rendered wire frame shape.

3. The computer-implemented method of claim 1, wherein receiving the first input to manipulate the first visually rendered wire frame shape includes receiving input to click or drag a handle of the first visually rendered wire frame shape, the first visually rendered wire frame shape comprising one or more handles.

4. The computer-implemented method of claim 1, wherein the second visually rendered wire frame shape has a geometric correspondence with a flare center point and the method further comprises:
   receiving a second input to add a flare center point;
   modifying the second visually rendered wire frame shape in accordance to the second input; and
   presenting the plurality of visually rendered wire frame shapes including a visual rendering of the flare center point.

5. The computer-implemented method of claim 4, wherein receiving the second input to add the flare center point comprises:
   receiving a click and a drag, the click defining a location in a target image to establish the flare center point, the drag defining a size of a flare center.

6. The computer-implemented method of claim 5, wherein presenting the plurality of visually rendered wire frame shapes includes presenting a visual rendering of the flare center and a visual rendering of a halo centered on the center point, the halo having a size determined as a percentage of the size of the flare center.

7. The computer-implemented method of claim 1, wherein the second visually rendered wire frame shape has a geometric correspondence with a flare ray and the method further comprises:
   receiving a second input to add a flare ray to an existing lens flare, the existing lens flare comprising a center point;
   modifying the second visually rendered wire frame shape in accordance to the second input; and
   presenting the plurality of visually rendered wire frame shapes including a visual rendering of the flare ray, the visual rendering of the flare ray comprising one or more handles.

8. The computer-implemented method of claim 7, wherein receiving the second input to add the flare ray comprises:
   receiving a click defining a first location in a target image to establish an endpoint for the flare ray, the flare ray extending from the center point of the existing lens flare to the endpoint.

9. The computer-implemented method of claim 8, further comprising:
   changing one or more of a length or a direction of the flare ray by selecting a handle at the endpoint of the flare ray and dragging the handle to a second location in the target image, the changed flare ray extending from the center point of the existing lens flare to the second location.

10. The computer-implemented method of claim 1, wherein the second visually rendered wire frame shape has a geometric correspondence with a flare ring and the method further comprises:
    receiving a second input to add a flare ring to an existing lens flare, the existing lens flare comprising a center point;
    modifying the second visually rendered wire frame shape in accordance to the second input; and
    presenting the plurality of visually rendered wire frame shapes including a visual rendering of the flare ring.

11. The computer-implemented method of claim 10, wherein receiving the second input to add the flare ring comprises:
    receiving a first click, a second click, and a drag, the first click defining a first location in a target image to establish an endpoint for a line, the line extending from the center point of the existing lens flare to the endpoint, the second click defining a second location on the line to establish the center of the flare ring, the drag defining the radius of the flare ring.

12. A computer program product, tangibly encoded on a computer-readable medium, operable to cause a data processing apparatus to perform operations comprising:
presenting a plurality of visually rendered wire frame shapes, each one of the plurality of visually rendered wire frame shapes having a geometric correspondence with a lens flare component, each lens flare component being one of: a center point, a flare ring, a flare ray, or a halo;
receiving a first input to manipulate a first visually rendered wire frame shape in the plurality of visually rendered wire frame shapes to interactively change the position or form of a first corresponding lens flare component;
presenting a visual rendering of the first corresponding lens flare component where the visual rendering reflects the change in the position or the form of the first corresponding lens flare component; and
automatically modifying a location or size of a second visually rendered wire frame shape in the plurality of visually rendered wire frame shapes to compensate for the change to the first lens flare component, the second visually rendered wire frame shape being different from the first visually rendered wire frame shape.

13. The computer program product of claim 12, wherein presenting the plurality of visually rendered wire frame shapes includes presenting one or more handles for each visually rendered wire frame shape.

14. The computer program product of claim 12, wherein receiving the first input to manipulate the first visually rendered wire frame shape includes receiving input to click or drag a handle of the first visually rendered wire frame shape, the first visually rendered wire frame shape comprising one or more handles.

15. The computer program product of claim 12, wherein the second visually rendered wire frame shape has a geometric correspondence with a flare center point and the computer program product is further operable to cause a data processing apparatus to perform operations comprising:
receiving a second input to add a flare center point;
modifying the second visually rendered wire frame shape in accordance to the second input; and
presenting the plurality of visually rendered wire frame shapes including a visual rendering of the flare center point.

16. The computer program product of claim 15, wherein receiving the second input to add the flare center point comprises:
receiving a click and a drag, the click defining a location in a target image to establish the flare center point, the drag defining a size of a flare center.

17. The computer program product of claim 16, wherein presenting the plurality of visually rendered wire frame shapes includes presenting a visual rendering of the flare center and a visual rendering of a halo centered on the center point, the halo having a size determined as a percentage of the size of the flare center.

18. The computer program product of claim 12, wherein the second visually rendered wire frame shape has a geometric correspondence with a flare ray and the computer program product is further operable to cause a data processing apparatus to perform operations comprising:
receiving a second input to add a flare ray to an existing lens flare, the existing lens flare comprising a center point;
modifying the second visually rendered wire frame shape in accordance to the second input; and
presenting the plurality of visually rendered wire frame shapes including a visual rendering of the flare ray, the visual rendering of the flare ray comprising one or more handles.

19. The computer program product of claim 18, wherein receiving the second input to add the flare ray comprises:
receiving a click defining a first location in a target image to establish an endpoint for the flare ray, the flare ray extending from the center point of the existing lens flare to the endpoint.

20. The computer program product of claim 19, further operable to cause a data processing apparatus to perform operations comprising:
changing one or more of a length or a direction of the flare ray by selecting a handle at the endpoint of the flare ray and dragging the handle to a second location in the target image, the changed flare ray extending from the center point of the existing lens flare to the second location.

21. The computer program product of claim 12, wherein the second visually rendered wire frame shape has a geometric correspondence with a flare ring and the computer program product is further operable to cause a data processing apparatus to perform operations comprising:
receiving a second input to add a flare ring to an existing lens flare, the existing lens flare comprising a center point;
modifying the second visually rendered wire frame shape in accordance to the second input; and
presenting the plurality of visually rendered wire frame shapes including a visual rendering of the flare ring.

22. The computer program product of claim 21, wherein receiving the second input to add the flare ring comprises:
receiving a first click, a second click, and a drag, the first click defining a first location in a target image to establish an endpoint for a line, the line extending from the center point of the existing lens flare to the endpoint, the second click defining a second location on the line to establish the center of the flare ring, the drag defining the radius of the flare ring.

23. A system comprising one or more computers operable to perform operations comprising:
presenting a plurality of visually rendered wire frame shapes, each one of the plurality of visually rendered wire frame shapes having a geometric correspondence with a lens flare component, each lens flare component being one of: a center point, a flare ring, a flare ray, or a halo;
receiving a first input to manipulate a first visually rendered wire frame shape in the plurality of visually rendered wire frame shapes to interactively change the position or form of a first corresponding lens flare component;
presenting a visual rendering of the first corresponding lens flare component where the visual rendering reflects the change in the position or the form of the first corresponding lens flare component; and
automatically modifying a location or size of a second visually rendered wire frame shape in the plurality of visually rendered wire frame shapes to compensate for the change to the first lens flare component, the second visually rendered wire frame shape being different from the first visually rendered wire frame shape.

24. The system of claim 23, wherein presenting the plurality of visually rendered wire frame shapes includes presenting one or more handles for each visually rendered wire frame shape.

25. The system of claim 23, wherein receiving the first input to manipulate the first visually rendered wire frame shape includes receiving input to click or drag a handle of the first visually rendered wire frame shape, the first visually rendered wire frame shape comprising one or more handles.

26. The system of claim 23, wherein the second visually rendered wire frame shape has a geometric correspondence with a flare center point and the system is further operable to perform operations comprising:
- receiving a second input to add a flare center point;
- modifying the second visually rendered wire frame shape in accordance to the second input; and
- presenting the plurality of visually rendered wire frame shapes including a visual rendering of the flare center point.

27. The system of claim 26, wherein receiving the second input to add the flare center point includes:
- receiving a click and a drag, the click defining a location in a target image to establish the flare center point, the drag defining a size of a flare center.

28. The system of claim 27, wherein presenting the plurality of visually rendered wire frame shapes includes presenting a visual rendering of the flare center and a visual rendering of a halo centered on the center point, the halo having a size determined as a percentage of the size of the flare center.

29. The system of claim 23, wherein the second visually rendered wire frame shape has a geometric correspondence with a flare ray and the system is further operable to perform operations comprising:
- receiving a second input to add a flare ray to an existing lens flare, the existing lens flare comprising a center point;
- modifying the second visually rendered wire frame shape in accordance to the second input; and
- presenting the plurality of visually rendered wire frame shapes including a visual rendering of the flare ray, the visual rendering of the flare ray comprising one or more handles.

30. The system of claim 29, wherein receiving the second input to add the flare ray comprises:
- receiving a click defining a first location in a target image to establish an endpoint for the flare ray, the flare ray extending from the center point of the existing lens flare to the endpoint.

31. The system of claim 30, further operable to perform operations comprising:
- changing one or more of a length or a direction of the flare ray by selecting a handle at the endpoint of the flare ray and dragging the handle to a second location in the target image, the changed flare ray extending from the center point of the existing lens flare to the second location.

32. The system of claim 23, wherein the second visually rendered wire frame shape has a geometric correspondence with a flare ring and the system is further operable to perform operations comprising:
- receiving a second input to add a flare ring to an existing lens flare, the existing lens flare comprising a center point;
- modifying the second visually rendered wire frame shape in accordance to the second input; and
- presenting the plurality of visually rendered wire frame shapes including a visual rendering of the flare ring.

33. The system of claim 32, wherein receiving the second input to add the flare ring comprises:
- receiving a first click, a second click, and a drag, the first click defining a first location in a target image to establish an endpoint for a line, the line extending from the center point of the existing lens flare to the endpoint, the second click defining a second location on the line to establish the center of the flare ring, the drag defining the radius of the flare ring.

* * * * *